(12) United States Patent
Shah

(10) Patent No.: US 9,898,076 B1
(45) Date of Patent: Feb. 20, 2018

(54) ADJUSTING ELECTRONIC DISPLAYS BASED ON USER VIEWING POSITION

(71) Applicant: Amazon Technologies, Inc., Seattle, WA (US)

(72) Inventor: Suchit Shreyas Shah, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/611,671

(22) Filed: Feb. 2, 2015

(51) Int. Cl.
*G06F 3/033* (2013.01)
*G06F 3/01* (2006.01)
*G09G 3/22* (2006.01)

(52) U.S. Cl.
CPC ............... *G06F 3/012* (2013.01); *G09G 3/22* (2013.01)

(58) Field of Classification Search
CPC ............... G06F 3/012; G06F 1/3231; G06F 2200/1637; G06F 3/0304; G06F 3/04815; G09G 3/22; G09G 3/06; G09G 2320/0626; G09G 2354/00; G09G 2320/06; G09G 2360/14; G09G 2360/144; G02F 1/01; G02F 1/133553; G02F 1/1336; G02F 2001/133616; Y02B 60/1289
See application file for complete search history.

(56) References Cited

U.S. PATENT DOCUMENTS

| | | | |
|---|---|---|---|
| 8,225,229 B2 | 7/2012 | Thorn et al. | |
| 8,340,365 B2 * | 12/2012 | Thorn | G06F 1/3218 382/103 |
| 8,368,663 B2 * | 2/2013 | Izadi | G06F 3/0421 178/18.09 |
| 2005/0264502 A1 * | 12/2005 | Sprague | G02B 5/10 345/84 |
| 2009/0313584 A1 * | 12/2009 | Kerr | G06F 3/012 715/849 |
| 2012/0075166 A1 * | 3/2012 | Marti | G06F 3/011 345/1.1 |
| 2013/0100096 A1 * | 4/2013 | Webster | G09G 3/3466 345/207 |
| 2013/0300637 A1 * | 11/2013 | Smits | G03B 35/18 345/8 |
| 2014/0092472 A1 | 4/2014 | Woodgate et al. | |
| 2014/0118407 A1 * | 5/2014 | Duncan | G09F 13/16 345/690 |

(Continued)

*Primary Examiner* — Nelson Rosario
*Assistant Examiner* — Gerald Oliver
(74) *Attorney, Agent, or Firm* — Lee & Hayes, PLLC

(57) ABSTRACT

The disclosure pertains to aligning an electronic display or light reflected from the electronic display relative to a position of a user (i.e., viewer), and thus enhancing an overall perceived brightness, contrast ratio, and viewing angle performance of an electronic display (e.g., a specular reflective display) irrespective of illumination conditions (e.g., sunlight, airplane lighting, and overhead lamps). In some embodiments, an electronic device may determine user position data for a position of a user with respect to the electronic display. For example, the electronic device may capture images of the user using one or more image sensors. The user position data may then be processed by the electronic device to generate signals which may modify display characteristics of the electronic display to align an electronic display or light reflected from the electronic display relative to the position of the user.

20 Claims, 16 Drawing Sheets

(56) References Cited

U.S. PATENT DOCUMENTS

2014/0247211 A1* 9/2014 Hayashi ............. G02B 27/2214
                                                        345/156
2015/0170608 A1* 6/2015 Kim ..................... G09G 5/14
                                                        345/592

* cited by examiner

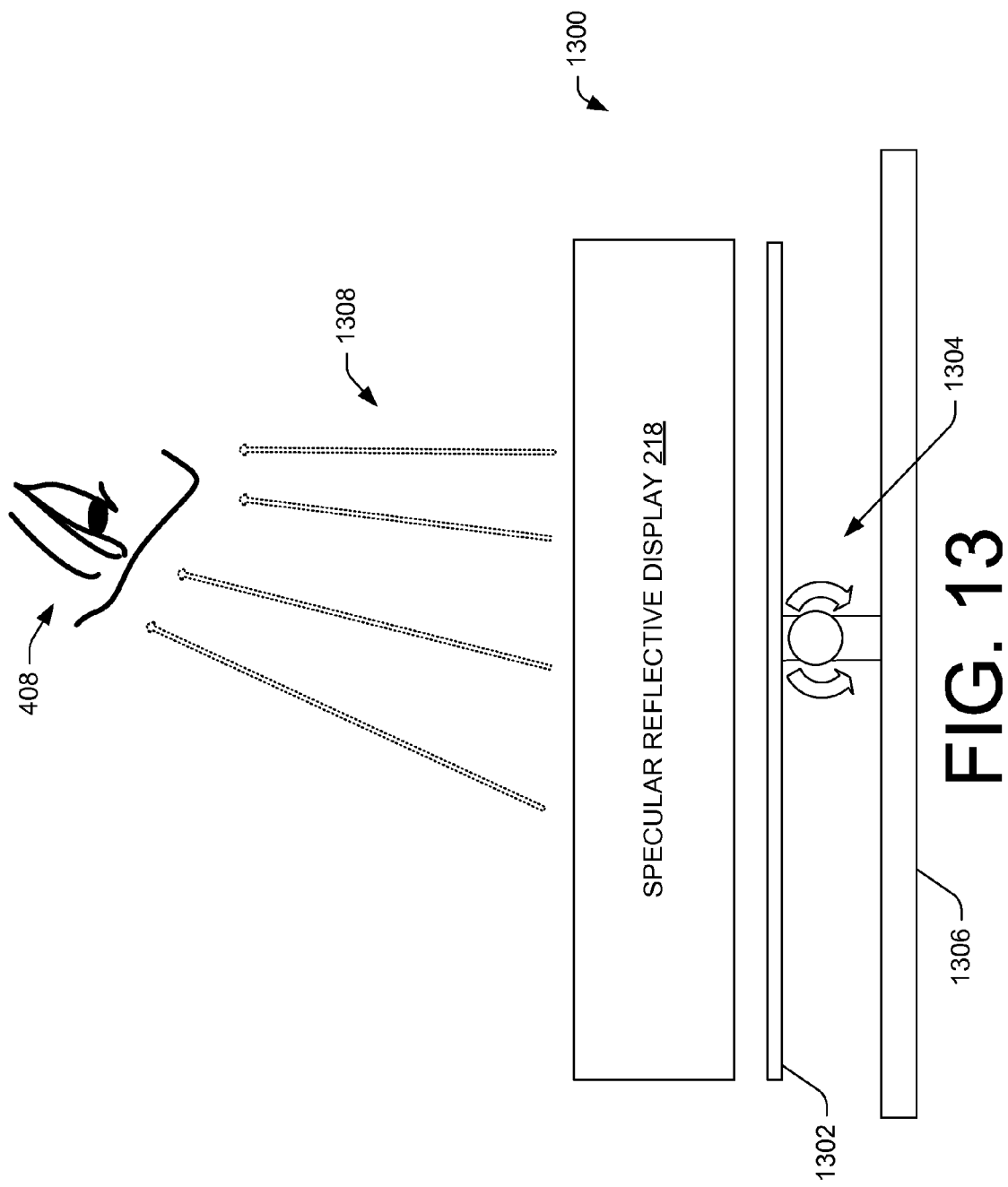

ADJUSTING ELECTRONIC DISPLAYS BASED ON USER VIEWING POSITION

BACKGROUND

Display technology continues to evolve to enable creation of displays that provide more vivid imagery, consume less power, are cheaper to manufacture, include few or no toxic materials, have smaller form factors, and so forth. In particular, performance of displays is often measured by contrast ratios, brightness metrics, resolution, and viewing angles. One driving point of this evolution is the popularity of display devices, which are common on almost all electronic devices. In addition, the size of the display devices has continued to grow for many product lines, such as televisions, which are now offered in larger sizes that were not available just a few years ago.

Specular reflective displays, which include transflective type displays, provide some improvements over exiting display technologies, such as an ability to display imagery using less power consumption than other display types. However, specular reflective displays exhibit relatively lower brightness metrics & contrast ratios compared to conventional emissive displays. These shortcomings are inherent in specular reflective displays because these displays rely on viewer position relative to the display and sometimes rely on external lighting conditions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 13 is a schematic diagram of an illustrative specular back-reflector that can be angled such that light exiting the electronic display is at least nearly parallel to a line of sight of a user gazing at the display.

DETAILED DESCRIPTION

Figure 1:
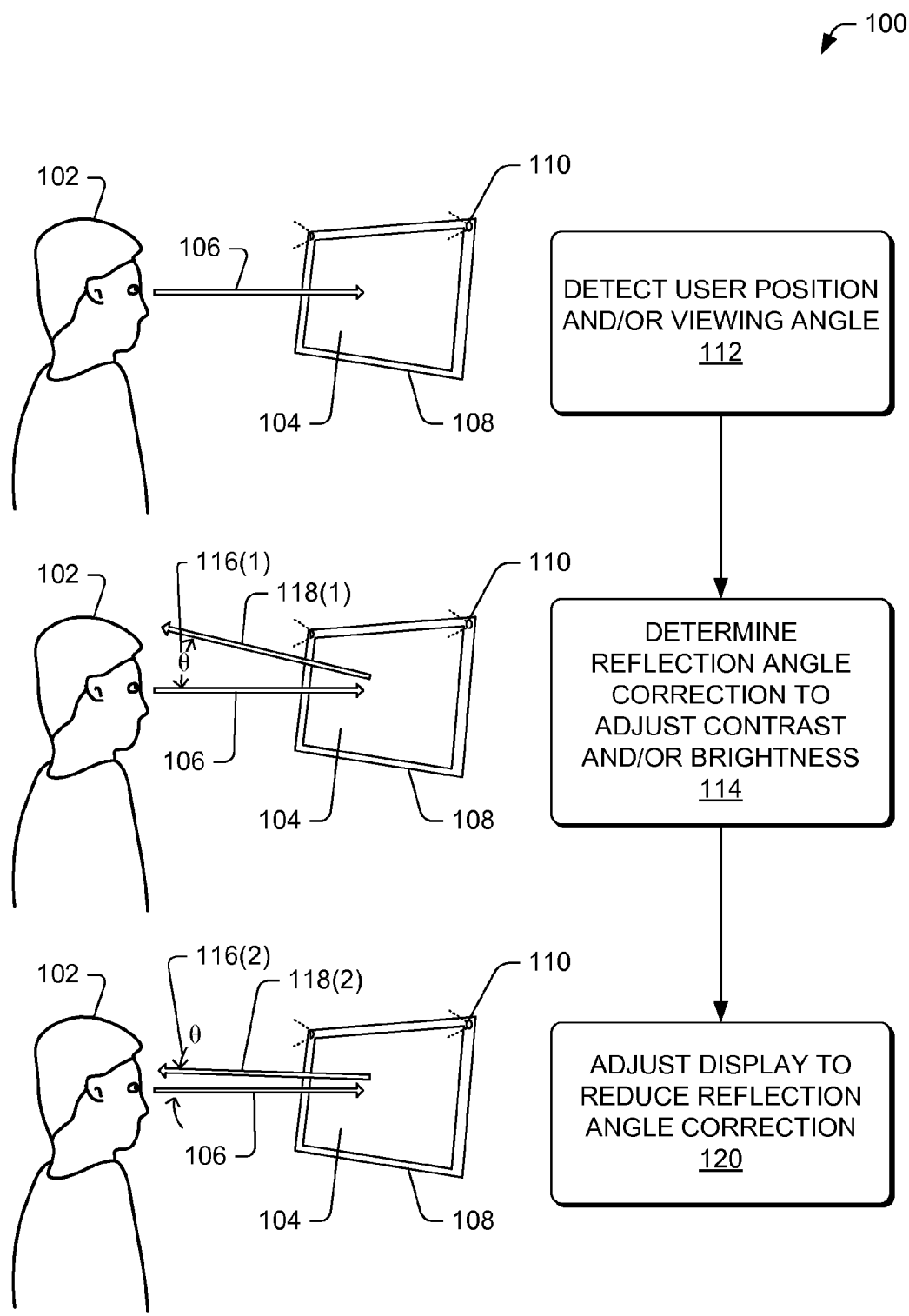
FIG. 1 is a pictorial flow diagram of an illustrative process to adjust an electronic display based on a determined user viewing position.

This disclosure is directed to improving a user experience while viewing an electronic display, such as a specular reflective display. In general, the disclosure pertains to aligning the display or light reflected from the display relative to a position of a user (i.e., viewer), and thus enhancing an overall perceived brightness, contrast ratio, and viewing angle performance of the specular reflective display irrespective of illumination conditions (e.g., sunlight, airplane lighting, and overhead lamps).

In some embodiments, an electronic device may determine user position data for a position of a user with respect to a specular reflective display. For example, the electronic device may capture images of the user using one or more image sensors (e.g., cameras). The user position data may then be processed by the electronic device to generate signals which may modify display characteristics of the specular reflective display. The user position data may be used to track a head of the user, a gaze of the user, eyes of the user, and/or other aspects of the user while interacting with or otherwise viewing the specular reflective display.

In some embodiments, the electronic device and/or the specular reflective display may process the signals to determine an adjustment to an internal light source, such as a light emitting diode (LED) to change an angle or direction of light reflected into or from the specular reflective display. For example, the specular reflective display may include an array of lights which may be selectively turned on/off depending on a detected position of the user. The selected light(s) may cause emission of light in alignment or near alignment with the gaze of the user (i.e., line of sight of the user while viewing the display). Stated another way, the selection of the light(s) may cause emitted light to exit the specular reflective display in a direction to intersect the position where a face of the user is relative to the electronic device. In this example, the light source may be included in the specular reflective display, in the electronic device, and/or may be external to the electronic device.

In various embodiments, the electronic device and/or the specular reflective display may process the signals to determine an adjustment to redirect a direction of light from external sources (e.g., ambient light) and/or internal sources (e.g., LEDs) towards the specular reflective display by use of films, lens, light guides, light piping, and/or other static or movable structures. The redirected light may then be in alignment or near alignment with the gaze of the user.

In accordance with one or more embodiments, the electronic device and/or the specular reflective display may process the signals to determine an adjustment to rotate or otherwise move at least a portion of the specular reflective display (e.g., the entire display, sections of the display, pixels of the display) using electrical and/or mechanical devices (e.g., micro-electromechanical systems (MEMS)). These techniques may also be used to move a back reflector. The redirected light may then be in alignment or near alignment with the gaze of the user.

In some embodiments, the electronic device and/or the specular reflective display may process the signals to determine an adjustment to manipulate refractive index changing materials at a bottom (i.e., back layer) of a display stack for transflective displays. The redirected light may then be in alignment or near alignment with the gaze of the user.

In various embodiments, the relative position and/or orientation of a viewer of an electronic device can be determined using at least one image capture element of the device. For example, the feed from a video camera can be analyzed to locate a relative position of the viewer in the video feed, which can be analyzed to determine the relative direction of the viewer (e.g., what the user is looking at, etc.). In some embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. In some embodiments, infrared (IR) imaging can be used to detect specific features of the viewer, such as the viewer's eyes, for use in determining and/or tracking the location of the viewer. Changes in the orientation and/or position of the device can be determined using at least one motion sensor of the device, in order to provide for a higher sampling frequency than might otherwise be possible using the image information captured by the camera, or otherwise attempt to improve the relative position determinations.

In at least some embodiments, the electronic device can attempt to determine changes in the relative position, direction, and/or orientation between the viewer and device in order to update reflective characteristics of the specular reflective display. For example, the device can continue capturing and analyzing image information to attempt to determine changes in relative position of the viewer, such as may be based on movement of the viewer and/or the device. The device also can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed.

The techniques and systems described herein may be implemented in a number of ways. Example implementations are provided below with reference to the following figures.

FIG. 1 is a pictorial flow diagram of an illustrative process 100 to adjust a specular reflective display based on a determined user viewing position. As shown in FIG. 1, a user 102 may view a specular reflective (SR) display 104. As shown, the user's line of sight toward the SR display 104 is the user's gaze 106. The SR display 104 may be housed in an electronic device 108, which may include one or more image sensors 110 to detect a position of the user 102. An example of the SR display 104 is an electrowetting display designed by Liquavista®. In electrowetting, a modification of the surface tension is used to obtain a simple optical switch by contracting a colored oil film electrically. Without a voltage, the colored oil forms a continuous film and the color is visible to a user (viewer). When a voltage is applied to the display pixel the oil is displaced and the pixel becomes transparent. When different pixels are independently activated, the display can show content like a photograph, text, a video, or other imagery.

At 112, the electronic device 110 and/or the SR display 104 may detect a user position and/or viewing angle of the user from imagery captured by the image sensor(s) 110. Thus, the user's gaze 106 may be detected and/or approximated by detecting a position of the user relative to the electronic device 110 and/or relative to the SR display 104. In some embodiments, this process may use head detection algorithms, eye detection algorithms, and/or other image analysis to determine a position of the user and/or an approximate line of sight (the gaze 106) of the user toward the SR display 104. Additional details on these techniques are discussed below with reference to FIGS. 14A-16B.

At 114, the electronic device 110 and/or the SR display 104 may determine a reflection angle correction, θ, 116(1), that may improve or optimize the user's experience when viewing the SR display 104. The user's experience may be improved by enhancing an overall perceived brightness, contrast ratio, and viewing angle performance of the specular reflective display irrespective of illumination conditions (e.g., sunlight, airplane lighting, and overhead lamps). The reflection angle correction, θ, 116(1) may be an angle between a pre-adjustment direction of light reflection 118(1) from the SR display 104 and the direction of the gaze 106.

At 120, the electronic device 110 and/or the SR display 104 may adjust the SR display (including components of the display such as lights, reflective panels, films, electrical/mechanical devices, and/or other components) to create a resultant direction of light reflection 122 from the SR display 104. The resultant direction of light reflection 118(2) may reduce a resultant reflection angle correction, θ, 116(2), or possibly eliminate any correction angle (i.e., when the resultant direction of light reflection 118(2) is parallel to the gaze 106). As discussed above, a reduction in the resultant reflection angle correction, θ, 116(2) may result in an enhancement in overall perceived brightness, contrast ratio, and viewing angle performance of the specular reflective display irrespective of illumination conditions.

Figure 2:
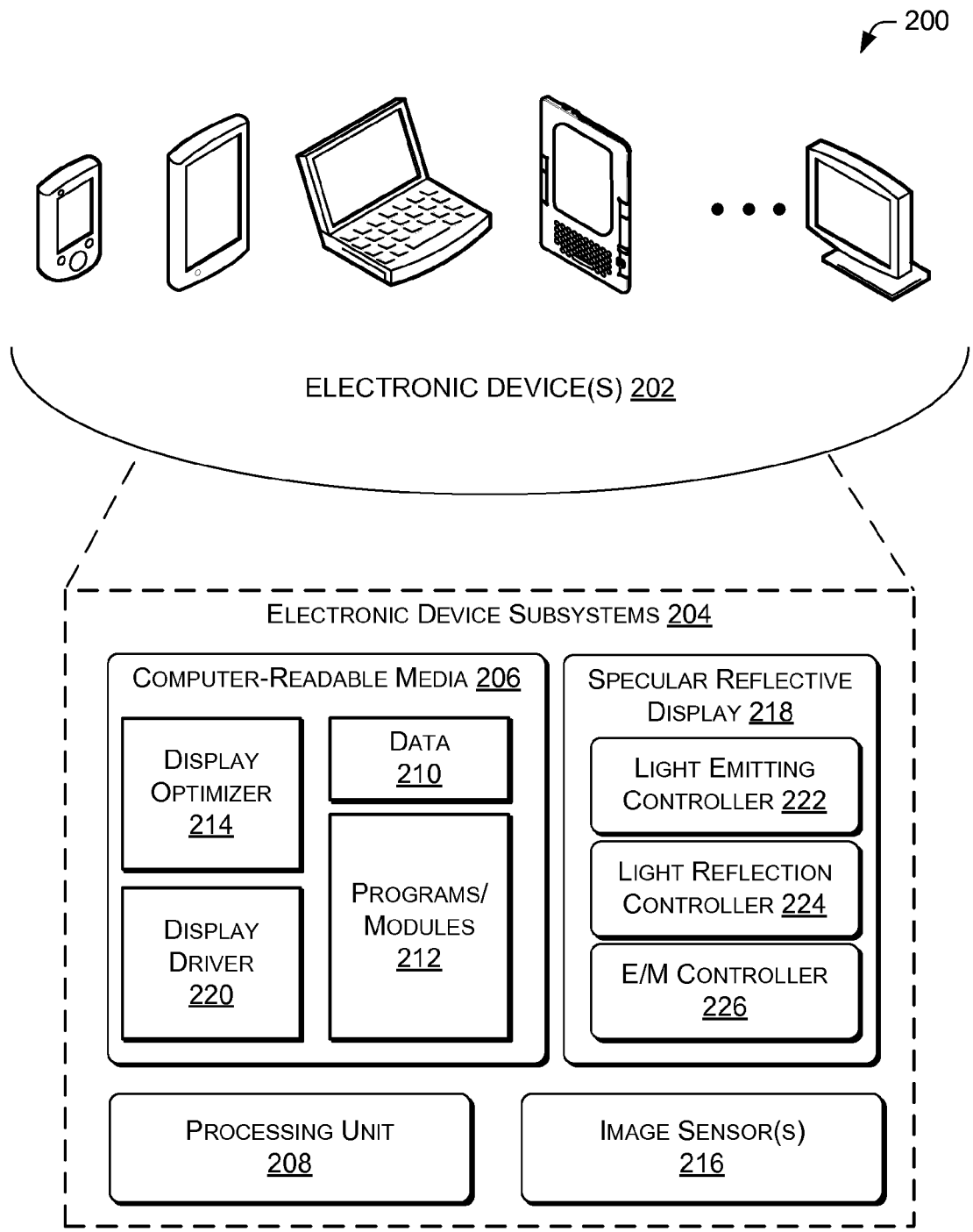
FIG. 2 is a block diagram of an illustrative computing architecture used to adjust an electronic display based on a determined user viewing position.

FIG. 2 is a block diagram of an illustrative computing architecture 200 used to adjust a specular reflective display based on a determined user viewing position. The computing architecture 200 may be implemented in a distributed or non-distributed computing environment. FIG. 2 shows illustrative electronic devices 202 (or simply "devices") that may include an electronic display (e.g., the SR display 104 shown in FIG. 1). A non-exhaustive list of the devices 202 may include a notebook computer, a music player, a mobile telephone (including smartphones), a tablet computer, an electronic book (eBook) reader device, and a monitor (with or without a television tuner), and so forth. The devices 202 may also include large display devices, such as billboards, large screen televisions/monitors, advertisements, information centers, and so forth, may be fixed in a location.

As illustrated, the devices 202 include various components 204. In some embodiments, the components 204 include computer-readable media 206 and one or more processors 208. The processors 208 interact with the computer-readable media 206 to execute instructions and facilitate operation of the device 202. The computer-readable media 206, meanwhile, may be used to store data 210, such as data files, audio and/or video media, electronic books (eBooks), or the like. In some embodiments, the data 210 may include information to cause adjustment of the SR display, as discussed below in greater detail. The computer-readable media 206 may also include software programs or other executable modules 212 that may be executed by the processors 208. Examples of such programs or modules include indexing modules for indexing data, reader programs, control modules (e.g., power management), network connection software, an operating system, sensor algorithms, and so forth.

The computer-readable media 206 may include volatile memory (such as RAM), nonvolatile memory, removable memory, and/or non-removable memory, implemented in any method or technology for storage of information, such as computer-readable instructions, data structures, program modules, or other data. Also, the processors 208 may include onboard memory in addition to or instead of the computer-readable media 206. Some examples of storage media that may be included in the computer-readable media 206 and/or processors 208 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the devices 202. Any such computer-readable media may be part of the devices 202. In some embodiments, the computer-readable media 206 may be non-transitory computer readable media.

In accordance with one or more embodiments, the computer-readable media 206 may include a display optimizer 214 that may process inputs from at least some of the components 204, such as an image sensor 216, to determine adjustments to a specular reflective display 218, as discussed herein. For example, the display optimizer 214 may detect a position of a user of the electronic device 202, determine a reflection angle correction, and cause adjustment to the SR display 218 to reduce or eliminate the reflection angle correction (as described above in the process 100 shown in FIG. 1). In various embodiments, the display optimizer may include an image recognition engine, which may utilize the image sensor(s) 216 to determine a position (possibly including distance, angle, etc.) of a portion of the user (e.g., a user's face, eyes, head) relative to the device. The image sensor 216 may be a still camera, a video camera, an infrared camera, a proximity sensor, and/or any other type of imaging device capable of detecting a location of a user relative to the device.

The computer-readable media 206 may also store component drivers, such as a display driver 220, that include instructions that, when executed by the processors 208, are used to control the various components 204, such as an SR display 218. For example, the component drivers may be programs that can be used to control the operation, power consumption, and various operational states of each of the components 204. Typically, each component has its own corresponding component driver. Thus, in some embodiments, the display optimizer 216 may adjust the SR display 218 via the display driver 220.

The SR display 218 may include at least one of a light emitting controller 222, a light reflection controller 224, and/or an electrical/mechanical (E/M) controller 226, which may process signals from the display optimizer to cause adjustment of the SR display 218. The light emitting controller 222 may process the signals to determine an adjustment to an internal light source, such as a light emitting diode (LED) to change an angle or direction of light reflected into or from the specular reflective display. For example, the specular reflective display may include an array of lights which may be selectively turned on/off depending on a detected position of the user. The selected light(s) may cause emission of light in alignment or near alignment with the gaze of the user (i.e., line of sight of the user while viewing the display). Stated another way, the selection of the light(s) may cause emitted light to exit the specular reflective display in a direction to intersect the position where a face of the user is relative to the electronic device.

The light reflection controller 224 may process the signals to determine an adjustment to redirect a direction of light from external sources (e.g., ambient light) and/or internal sources (e.g., LEDs) towards the specular reflective display by use of films, lens, light guides, light piping, and/or other static or movable structures. The redirected light may then be in alignment or near alignment with the gaze of the user.

The E/M controller 226 may process the signals to determine an adjustment to rotate or otherwise move at least a portion of the specular reflective display (e.g., the entire display, sections of the display, pixels of the display) using electrical and/or mechanical devices (e.g., micro-electromechanical systems (MEMS)). These techniques may also be used to adjust a position of a back reflector. In some embodiments, the electronic device and/or the specular reflective display may process the signals to determine an adjustment to manipulate refractive index changing materials at a bottom (i.e., back layer) of a display stack for transflective displays. The redirected light may then be in alignment or near alignment with the gaze of the user.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processors 208, as hardware, and/or as firmware. Typically, the functionality of the program modules may be combined or distributed as desired in various embodiments. An implementation of these modules and techniques may be stored on or transmitted across some form of computer-readable media.

Figure 3:
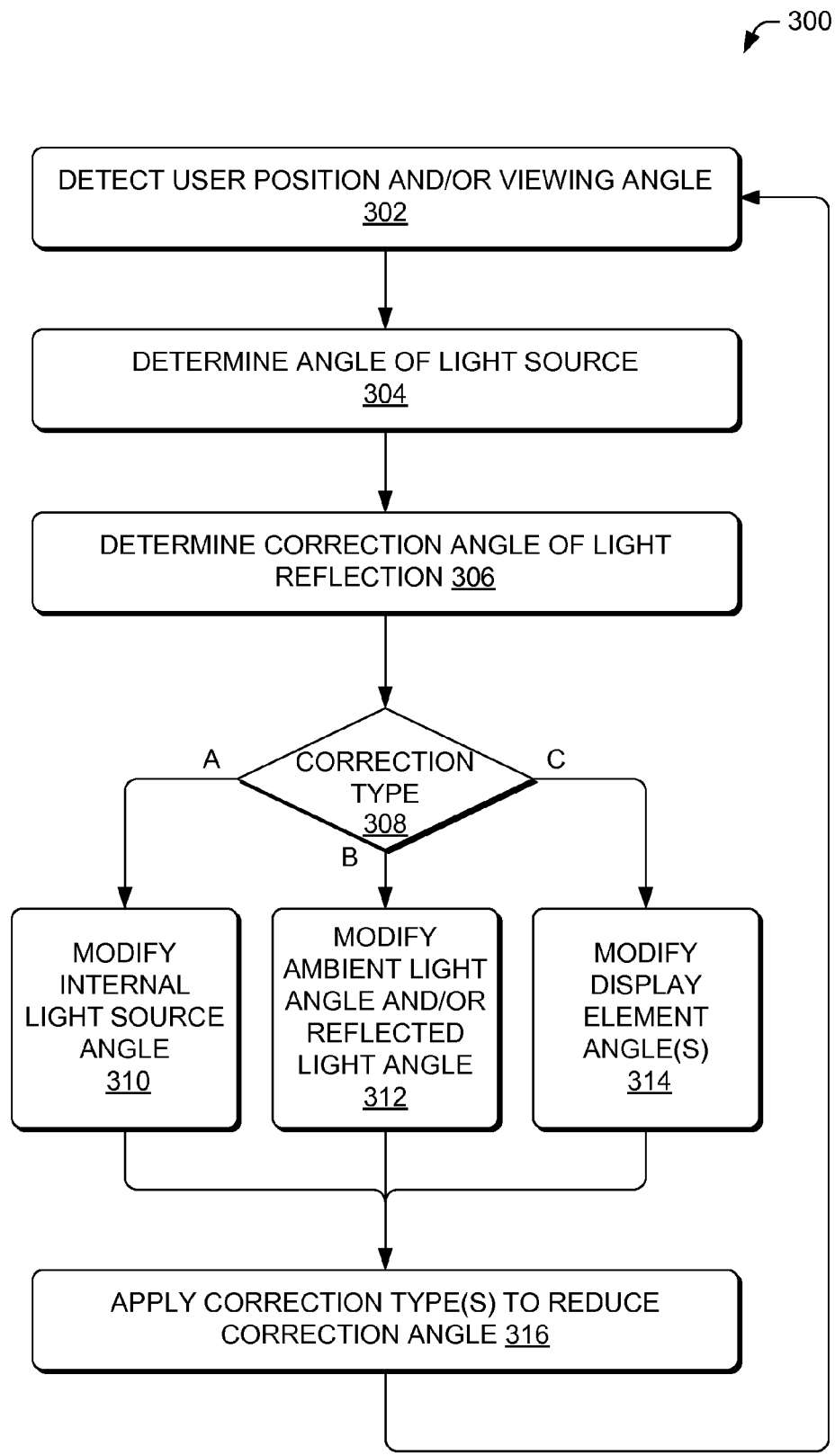
FIG. 3 is a flow diagram of another illustrative process to adjust an electronic display based on a determined user viewing position.

FIG. 3 is a flow diagram of an illustrative process 300 to adjust a specular reflective display based on a determined user viewing position. The process 300 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 300 is described with reference to the computing architecture 200.

At 302, the display optimizer 214 may detect a user position and/or viewing angle. In some embodiments, the display optimizer 214 may determine, based on output data from the at least one image sensor, position data representing a position where at least a portion (e.g., face, head, body, eyes) of a user is relative to the electronic device.

At 304, the display optimizer 214 may determine an angle of a light source. For example, the display optimizer 214 may determine a known or controlled direction of light emitted from the display (e.g., via backlight, a front light, etc.). The display optimizer 214 may detect a direction of light using the image sensor 216. The angle of the light correlates to the pre-adjustment direction of light reflection (labeled 118(1) in FIG. 1) from the SR display.

At 306, the display optimizer 214 may determine a correction angle of light reflection. The correction angle, when compensated for as discussed below, may cause light output from the display to align or nearly align with a gaze of the user, thereby enhancing an overall perceived brightness, contrast ratio, and viewing angle performance of the specular reflective display irrespective of illumination conditions. The display optimizer 214 may determine a correction angle of light reflection based at least partly on the outputs of the operations 302 and 304. In some embodiments, the display optimizer 214 may determine a change in a direction of light traveling through a portion of the electronic display based on the position data, wherein the change in direction causes the light to exit the electronic display in a direction to intersect the position where the at least the portion of the user is relative to the electronic display.

At 308, the display optimizer 214 may utilize one or more of the light emitting controller 222, the light reflection controller 224, and/or the E/M controller 226 to cause a reduction of the correction angle. Thus, the display optimizer may utilize a single one of the controllers, multiple controllers (if present), and/or all of the controllers depending on the configuration of the SR display 218 and/or type of adjustment desired.

At 310, following route "A", the light emitting controller 222 may modify an internal light source angle by determining an adjustment to an internal light source, such as a light emitting diode (LED) to change an angle or direction of light reflected into or from the specular reflective display. For example, the specular reflective display may include an array of lights which may be selectively turned on/off depending on a detected position of the user. The selected light(s) may cause emission of light in alignment or near alignment with the gaze of the user (i.e., line of sight of the user while viewing the display).

At 312, following route "B", the light reflection controller 224 may modify an ambient light angle and/or reflected light angle, such as by determining an adjustment to redirect a direction of light from external sources (e.g., ambient light) and/or internal sources (e.g., LEDs) towards the specular reflective display by use of films, lens, light guides, light piping, and/or other static or movable structures.

At 314, following route "C", the E/M controller 226 may modify a display element angle, such as by determining an adjustment to rotate or otherwise move at least a portion of the specular reflective display (e.g., the entire display, sections of the display, pixels of the display) using electrical/ mechanical devices (e.g., micro-electromechanical systems (MEMS)). These techniques may also be used to adjust a position of a back reflector.

Following implementation of the operation 310, 312, and/or 314, the process 300 may advance to an operation 316. At 316, the display optimizer 214 may apply the correction type(s) from the operations 310, 312, and/or 314 to reduce (or possibly eliminate) the correction angle determined at the operation 306. For example, multiple processes may occur in parallel to change a direction of light (e.g., multiple processes from a single operation, a process from each of two different operations, and so forth). The process 300 may then continue via a loop to the operation 302 to continually adjust the display to improve and/or optimize a user's viewing experience as discussed herein, such as to make further adjustments when the user moves relative to the display.

FIGS. 4-13 describe various embodiments of structures, techniques, and/or systems that may cause an adjustment of the light output from the SR display 218 as discussed above. Although FIGS. 4-13 show adjustments of directions/angles of light in two-dimensions, the disclosure also pertains to adjustments of directions/angles of light in three-dimensions (e.g., along axes X, Y, and Z of a Cartesian coordinate system). The structures, techniques, and/or systems may be implemented in an electronic display, in a housing of the electronic display, and/or in the electronic device. Each of the following FIGS. 4-13 represents a general solution to controlling a direction of travel of light with respect to the SR display, and therefore are intended to generally present each solution, which may be implemented in a great number of different ways using different configurations, many being of one's design preference and/or based on constraints imposed in form factors of the electronic devices.

Figure 4:
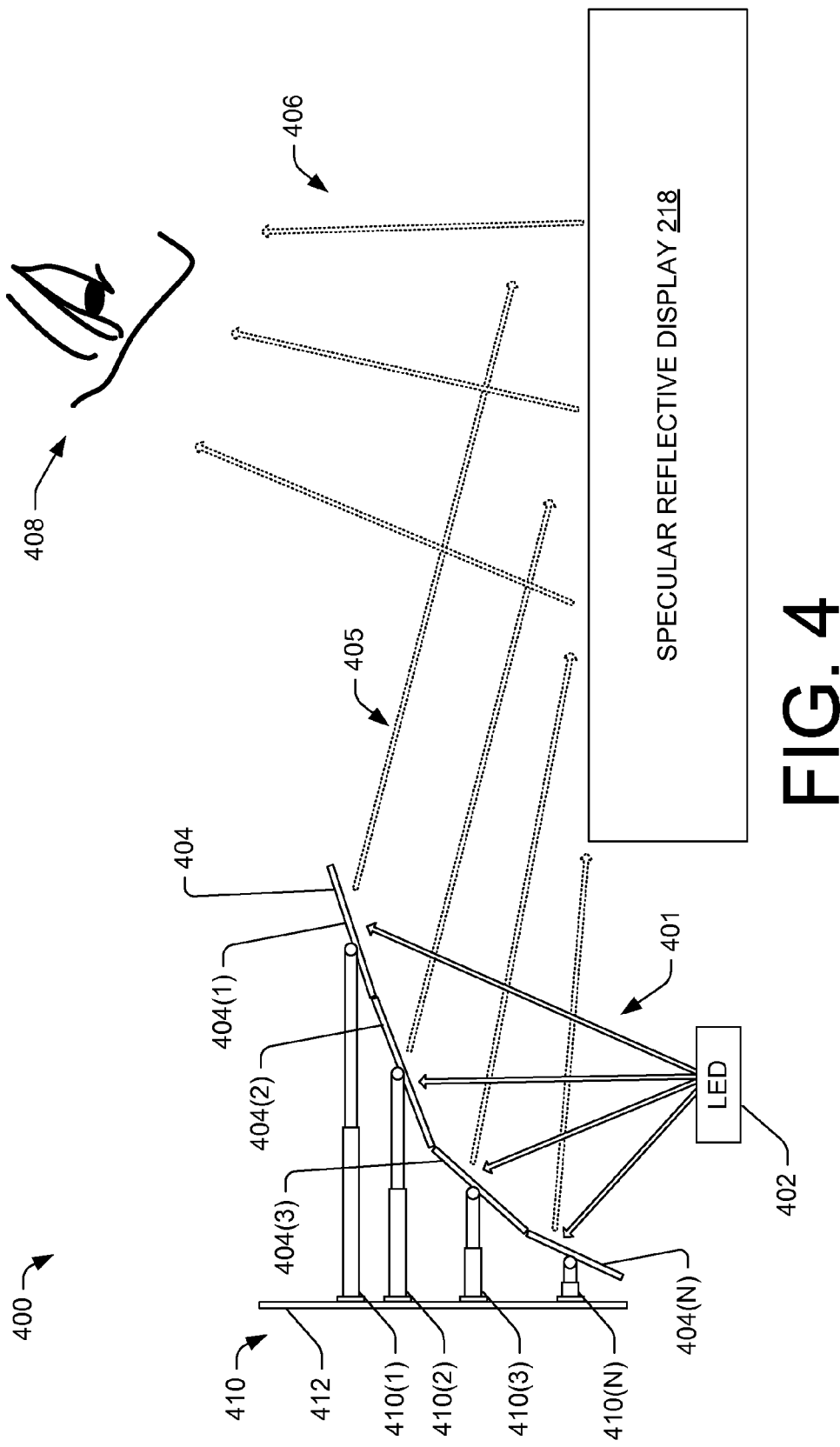
FIG. 4 is a schematic diagram of an illustrative movable reflective structure configured to modify an angle of light directed toward an electronic display.

FIG. 4 is a schematic diagram of an illustrative movable reflective structure 400 configured to modify an angle of light directed toward a specular reflective display. Initial light 401 emitted from a fixed light source 402 may travel toward moveable reflective panels 404, which may comprise a plurality of individually movable panels 404(1)-404(N). The initial light 401 may be reflected off the panels 404 in a determined angle from the panels 404 as first reflected light 405, which may travel in a determined direction toward the SR display 218. The first reflected light 405 may then be reflected by the SR display 218, as second reflected light 406 toward a determined user position 408.

The angle/orientation of the moveable reflective panels 404 may be controlled by the E/M controller 226 and/or the light reflection controller 224, which may cause movement of the panels 404 via moveable arms 410 which may correspond to each panel (e.g., 410(1)-(N)). The moveable arms 410 may move, pivot, change angle, and/or translate with respect to a structure 412. In some embodiments, the moveable arms 410 may include biasing devices that cause movement of the panels 404. The moveable arms 410 may enable rotation, pivoting, lateral movement, extension, and/or other movements of respective panels 404, which in turn may cause the light (e.g., the initial light 401) to reflect toward the SR display 218 at different determined angles. By changing the angle/orientation of individual panels 404, the resulting angle of the second reflected light 406 may be changed, and thus perceivable by the user. The orientation/angle of the panels 404 may be adjusted based on the determined user position 408, as discussed throughout this disclosure. Although FIG. 4 shows one possible solution control the panels 404 to adjust reflection of light from a fixed light source, other movable panel configurations may be used to redirect the light at a determined angle toward the SR display to achieve a similar result.

Figure 5:
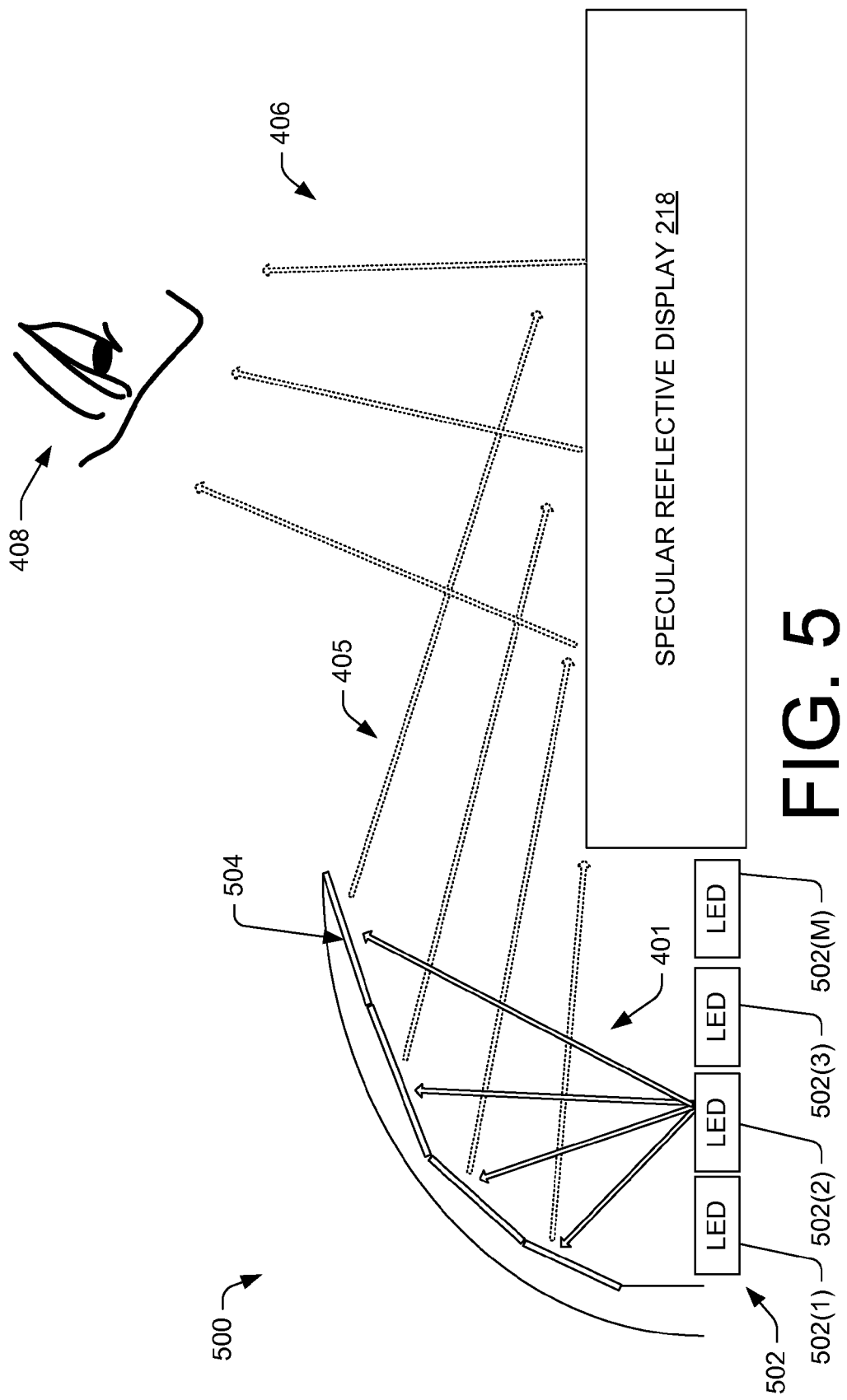
FIG. 5 is a schematic diagram of an illustrative array of lights that can be selectively activated to reflect light at different angles off of a reflective structure and onto an electronic display.

FIG. 5 is a schematic diagram of an illustrative array of lights that can be selectively activated to reflect light at different angles off of a fixed reflective structure 500 and onto a specular reflective display. An array of lights 502 may include a plurality of lights 502(1)-(M), which may be individually controlled or controlled in groups to cause emission of light from a predetermined location or locations. The light (the initial light 401) may then be reflected by the fixed reflective structure, which may include a plurality of panels 504 oriented at different angles. The panels 504, like the panels 404 discussed with reference to FIG. 4, may redirect the light to the display as the first reflected light 405, and then to determined user position 408 as the second reflected light 406. By changing which lights of the array of lights 502 emit light, the resulting angle of the second reflected light 406 may be changed, and thus perceivable by the user. The light emitting controller 22 may select which light(s) of the array of lights 502 to activate to emit light based on the determine user position, as discussed above.

In various embodiments, the array of lights 502 may include at least a first plurality of lights and a second plurality of lights, which may be arranged in an alternating layout. For example, the first plurality of lights may include the light 502(1) and 502(3) while the second plurality of lights may include the light 502(2) and 502(M). The first plurality of lights may be controlled as a group, and thus turned on, dimmed, intensified, and/or turned off together. Similarly, the second plurality of lights may be controlled as a group, and thus turned on, dimmed, intensified, and/or turned off together.

In some embodiments, light piping may be used to change the direction of the light directed toward the fixed reflective structure 500 or may be used as the fixed reflective structure 500 to direct light from activated lights (of the light array 502) toward the SR display 218 at a determined angle. For example, different light piping may be associated with different lights or groups of lights. When a first set of lights is activated, a first associated set of light pipes may direct the light toward the SR display at first angles. When a second different set of lights is activated, a second different set of light pipes may direct the light toward the SR display at second different angles.

Figure 6:
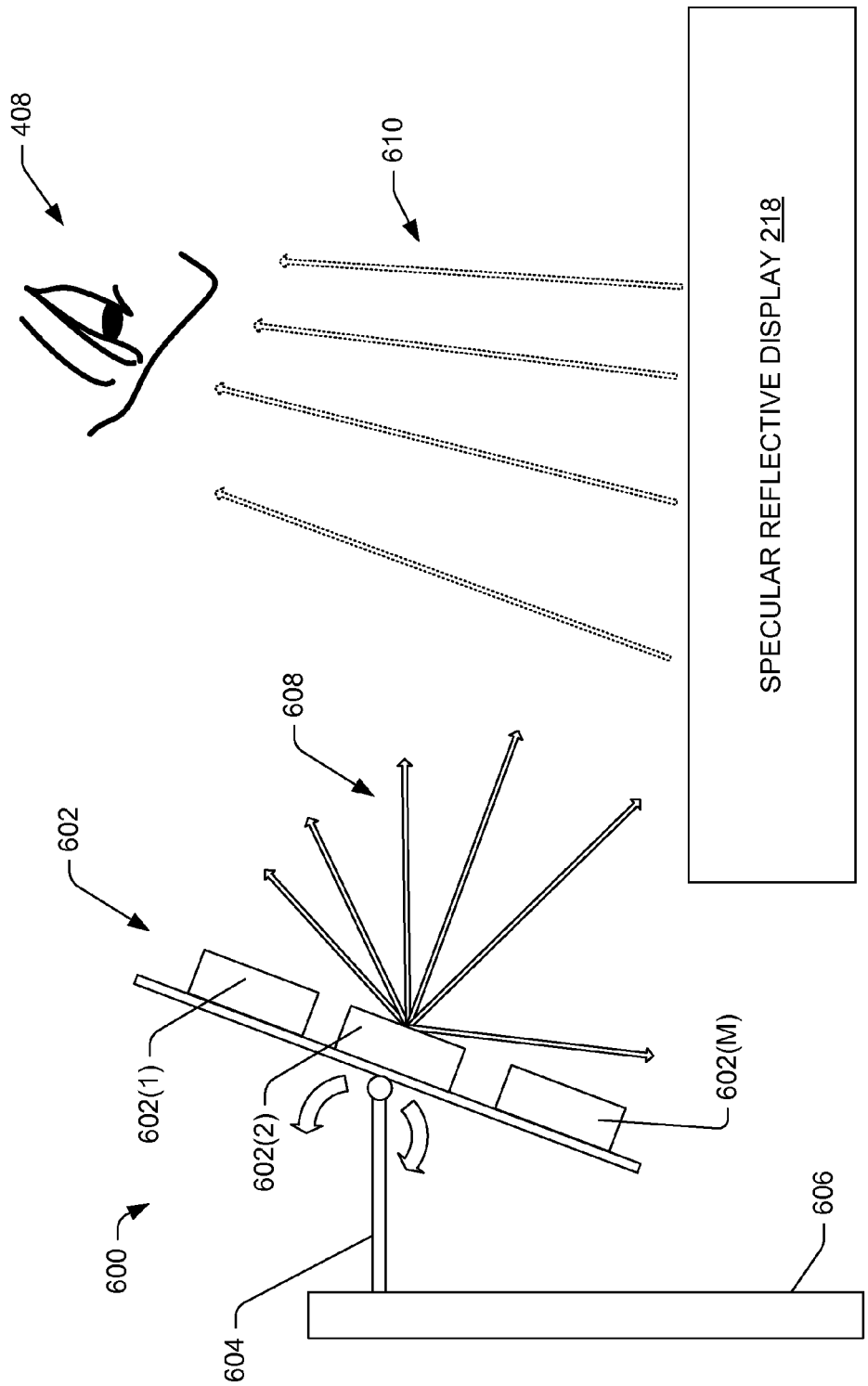
FIG. 6 is a schematic diagram of an illustrative moveable array of lights that can be positioned to modify an angle of light directed toward an electronic display.

FIG. 6 is a schematic diagram of an illustrative moveable structure 600 that includes an array of lights 602 that can be positioned to modify an angle of light directed toward a specular reflective display. The array of lights 602 may include a plurality of lights 602(1)-(M), which may be individually controlled or controlled in groups to cause emission of light from a predetermined location or locations. The moveable structure 600 may include an arm 604 rotatably and/or otherwise movably coupled to the array of lights 602 and to a structure 606 to enable changing a direction of light emitted by the lights in the array of lights 602. By moving the array of lights 602 (e.g., via rotation, translation, extension, etc.), light 608 emitted from one or more of the lights 602(1)-(M) may be directed toward the SR display 218 at different angles, which may then be redirected by the SR display 218 toward the determined user position 408 as reflected light 610. The E/M controller 226 may control the movement, orientation, and/or angle of the light array 602. The light emitting controller 222 may control which lights are activated, which may also modify the direction of light traveling toward the SR display 218 and then outward from the SR display 218. In some embodiments, the array of lights may be controlled together (e.g., all on or all off). Individual control of activation of the lights may be used to fine-tune a direction of the light that travels to the SR display.

Figure 7:
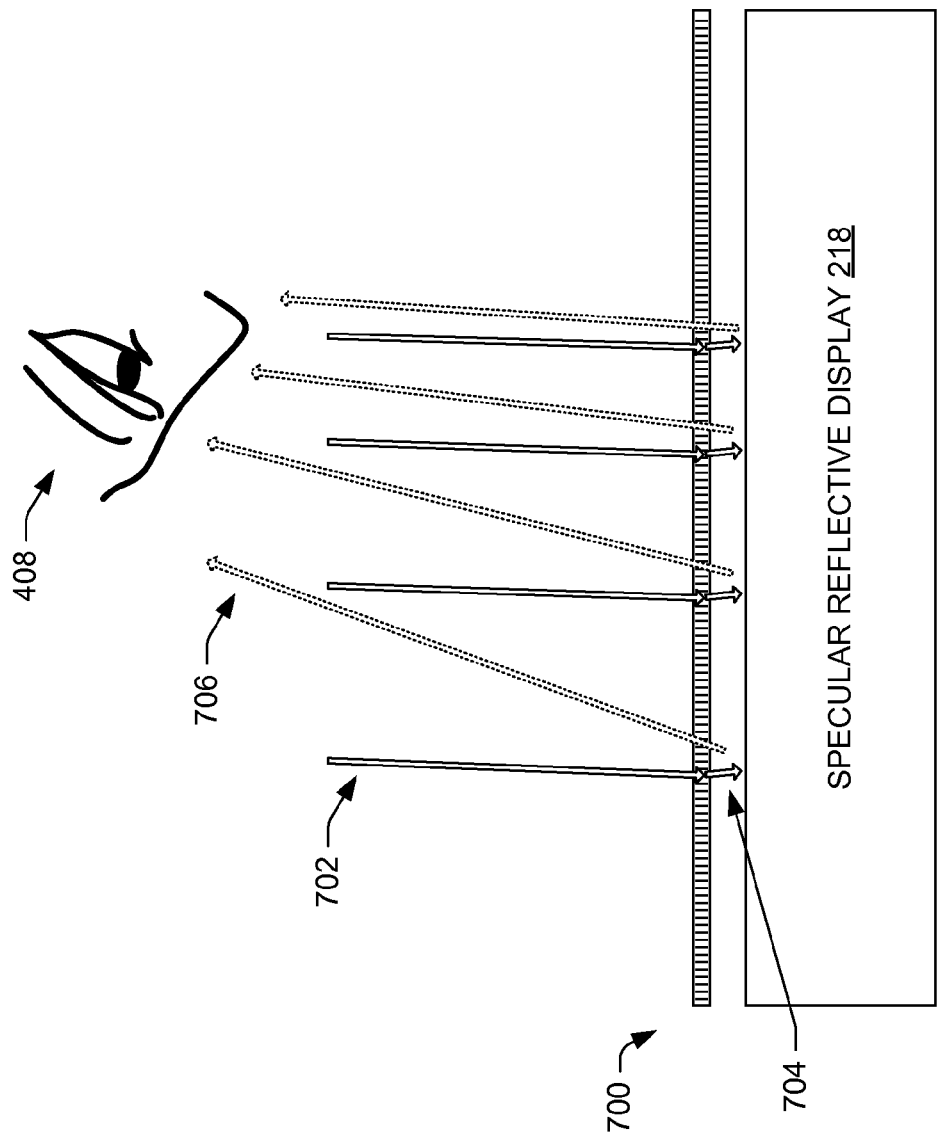
FIG. 7 is a schematic diagram of an illustrative lens that is configured to redirect incoming light toward the electronic display at a determined angle.

FIG. 7 is a schematic diagram of an illustrative lens 700 that is configured to redirect incoming light 702 toward the specular reflective display 218 at a determined angle. The lens 700 may be implemented as a liquid crystal lens or lenticular lens that redirects the incoming light by movement of rods or other features in the lens 700. For example, by changing a power state of the lens, the liquid crystal lens may change an angle of rods in the lens, which may change a direction of the light 702 that passes through the lens 700. In another example, by moving portions of a lenticular lens, light may be directed in different directions when exiting the lens towards the specular reflective display. The light 702 may be ambient light and/or light from a front light of the electronic device or from other sources. First redirected light 704 may then be redirected by the SR display 218 as second reflected light 706, which in turn travels toward the determined user location 408. The light reflection controller 224 may control the lens 700 by adjusting the orientation/angle of the rods, and thus adjusting the angle of the second reflected light 706 to direct this light towards the determined user position.

Figure 8:
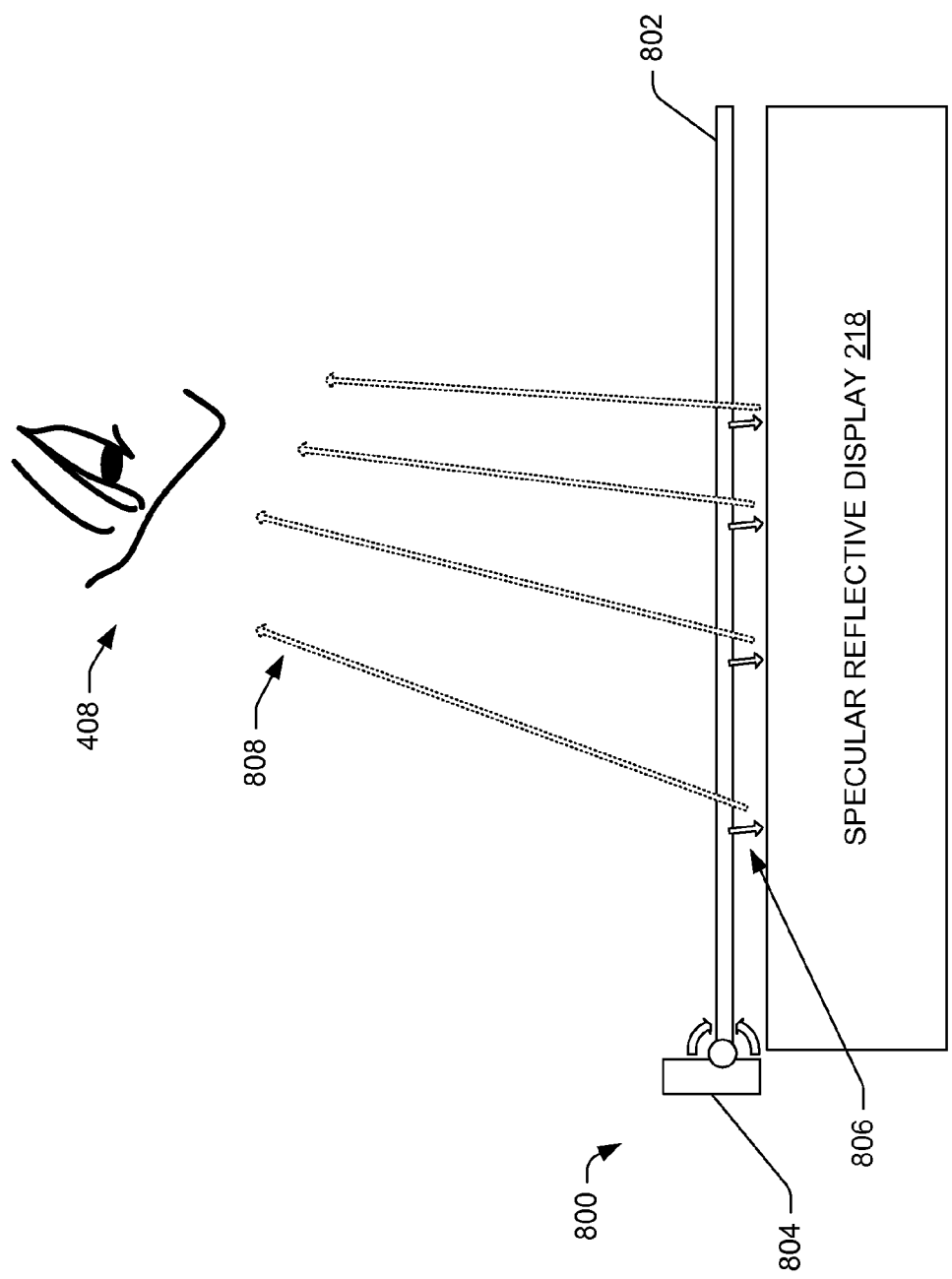
FIG. 8 is a schematic diagram of an illustrative movable light guide that is configured to redirect incoming light toward the electronic display at a determined angle.

FIG. 8 is a schematic diagram of an illustrative movable light guide 800 that is configured to redirect incoming light toward the specular reflective display 218 at a determined angle. A light guide 802 may direct incoming light from a front light. For example, by changing an angle of the light guide 802, via a movable mechanism 804 (e.g., a pivot, a ball joint, etc.), the light guide may change an angle that light (e.g., from a front light or other source) passes through the light guide 802. After the light is redirected by a change in angle of the light guide 802 via the movable mechanism 804, first redirected light 806 may then be redirected by the SR display 218 as second reflected light 808, which in turn travels toward the determined user location 408. The light reflection controller 224 and/or the E/M controller 226 may control the movement of the light guide 802 by the movable mechanism 804. For example, the moveable mechanism may be an electromechanical device that moves in response to control signals from a controller. Since the light guide 802 may be located in close proximity to the SR display 218, the adjustment angle of the light guide 802 may be relatively small, and only allow minor corrections (i.e., redirections of light). Therefore, this approach may be used with other approaches discussed herein to "fine tune" the angle of the reflected light.

Figure 9:
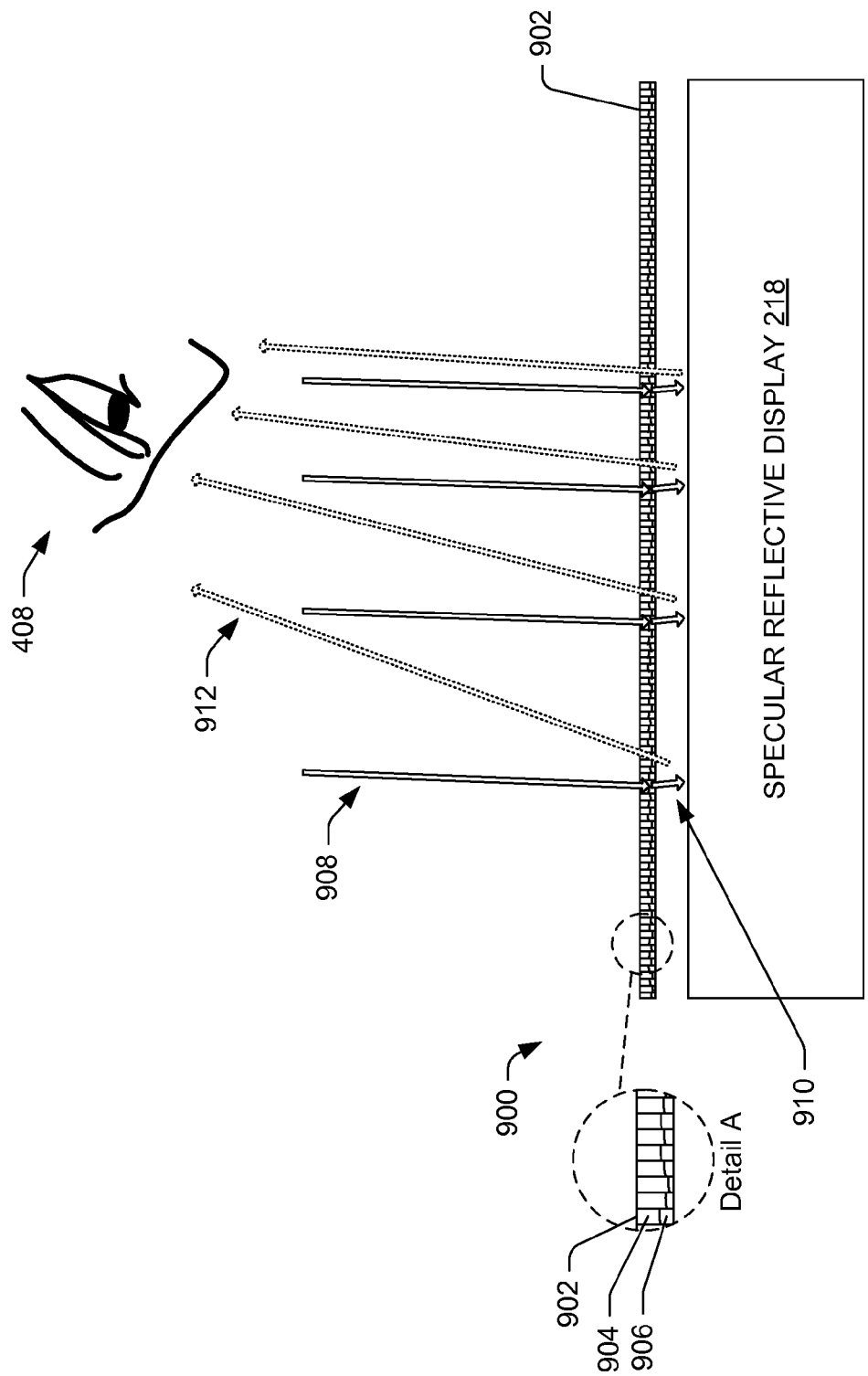
FIG. 9 is a schematic diagram of an illustrative lens having fluid-finable cavities that are configured to redirect incoming light toward the electronic display at a determined angle.

FIG. 9 is a schematic diagram of an illustrative lens assembly 900 having fluid-Tillable cavities that are configured to redirect (refract or reflect) incoming light toward the specular reflective display at a determined angle. A lens 902 may direct incoming light from a front light and/or ambient light. As shown in Detail A, the lens 902 may include cavities 904 (or films) capable of retaining a liquid 906, such as an electrophoretic liquid, which can change the angle/direction of light that passes through the cavity. For example, by adding the liquid 906 to one or more of the cavities 904 in the lens 902, the lens 902 may change an angle that light 908 (e.g., from a front light or other source) passes through the cavities in the lens 902. After the light 908 is redirected by a change in angle due to a presence of the liquid (or absence of the liquid) in the cavities of the lens 902, first redirected light 910 may then be redirected by the SR display 218 as second reflected light 912, which in turn travels toward the determined user location 408. The light reflection controller 224 and/or the E/M controller 226 may control movement of the liquid into, within, and out of the cavities, such as though use of electrical charges that cause movement of the liquid.

Figure 10:
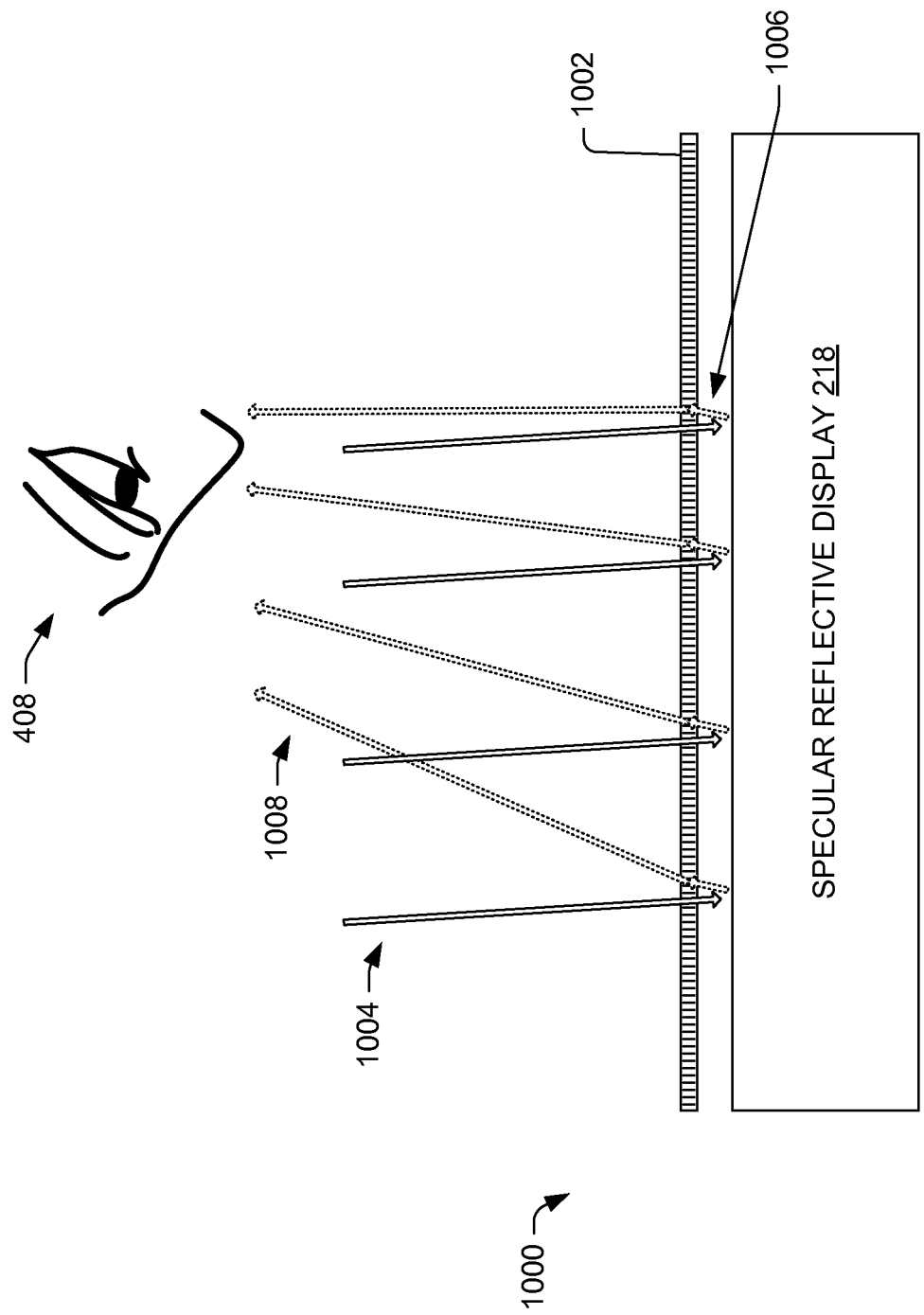
FIG. 10 is a schematic diagram of an illustrative layer that is configured to redirect light exiting the electronic display at a determined angle.

FIG. 10 is a schematic diagram of an illustrative layer 1000 that is configured to redirect light exiting the specular reflective display at a determined angle. The layer 1000 may include movable optics 1002, such as reflective polarizers and/or prism sheets, which may be located on top (outward user-facing layer) of the SR display 218. The movement of the movable optics 1102 may direct the light reflected back from the display towards the determined user position. For example, light 1004 (from a front light or rear light, ambient light, etc.) may reflect off of the SR display 218 as first reflected light 1006. The first redirected light 1006 may then be redirected by the movable optics 1002 as second reflected light 1008, which in turn travels toward the determined user location 408. The light reflection controller 224 and/or the E/M controller 226 may control movement of the moveable optics 1002. The movable optics 1002 may be mechanically moved, electrically moved, moved by MEMS and/or moved by other known techniques. Movement of the movable optics may deform the optics, which may cause the change in the redirection of light passing through the moveable optics 1002.

Figure 11:
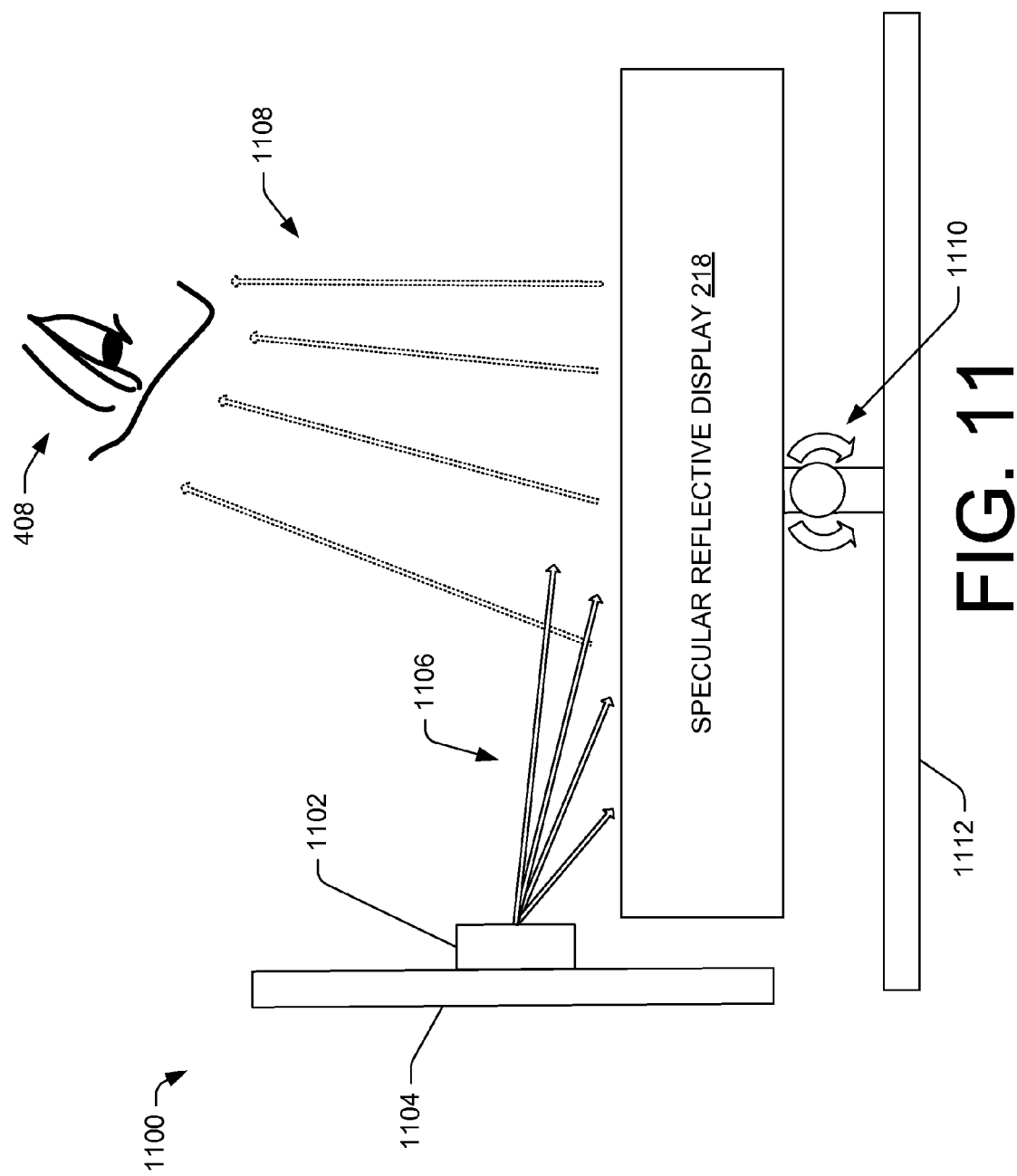
FIG. 11 is a schematic diagram of an illustrative moveable electronic display that can be angled toward a user such that the outward planar surface of the display is at least nearly perpendicular to a line of sight of the user gazing at the display.

FIG. 11 is a schematic diagram of an illustrative moveable specular reflective display 1100 that can be angled toward a user such that the outward planar surface of the display is at least nearly perpendicular to a line of sight of the user gazing at the display. A light source 1102 may be mounted on a structure 1104. The light source 1102 may emit light 1106 that reflects off of the SR display 218 (or a portion of the SR display, such as pixel or group of pixels). Redirected light 1108 may then travel toward the determined user location 408. The SR display 218 (or a portion of the SR display, such as pixel or group of pixels) may be movable (rotatable, pivot, etc.) by a moveable mechanism 1110 coupled to another structure 1112. Thus, the moveable mechanism 1110 may adjust an angle of the SR display or a portion of the SR display 218, causing a change in the direction of the redirected light 1108. The E/M controller 226 may control the movement of the SR display or portion of the SR display by the movable mechanism 1110. For example, the moveable mechanism 1110 may be an electromechanical device that moves in response to control signals from a controller. To enable greater changes in angles (redirection of the light), the movable mechanism may be used for smaller segments of the SR display, such as for groups of pixels or possibly even for each individual pixel. In the latter implementation, a plurality of movable mechanisms could move corresponding pixels to direct light toward the determined user position. This implementation may benefit larger displays, such as fixed wall or building mounted displays, for example. In some embodiments, multiple lights, which can be selectively activated, may be used in these embodiments, which may combine concepts discussed above with respect to FIG. 5. This approach may also be effective when ambient light is a primary source of light.

Figure 12:
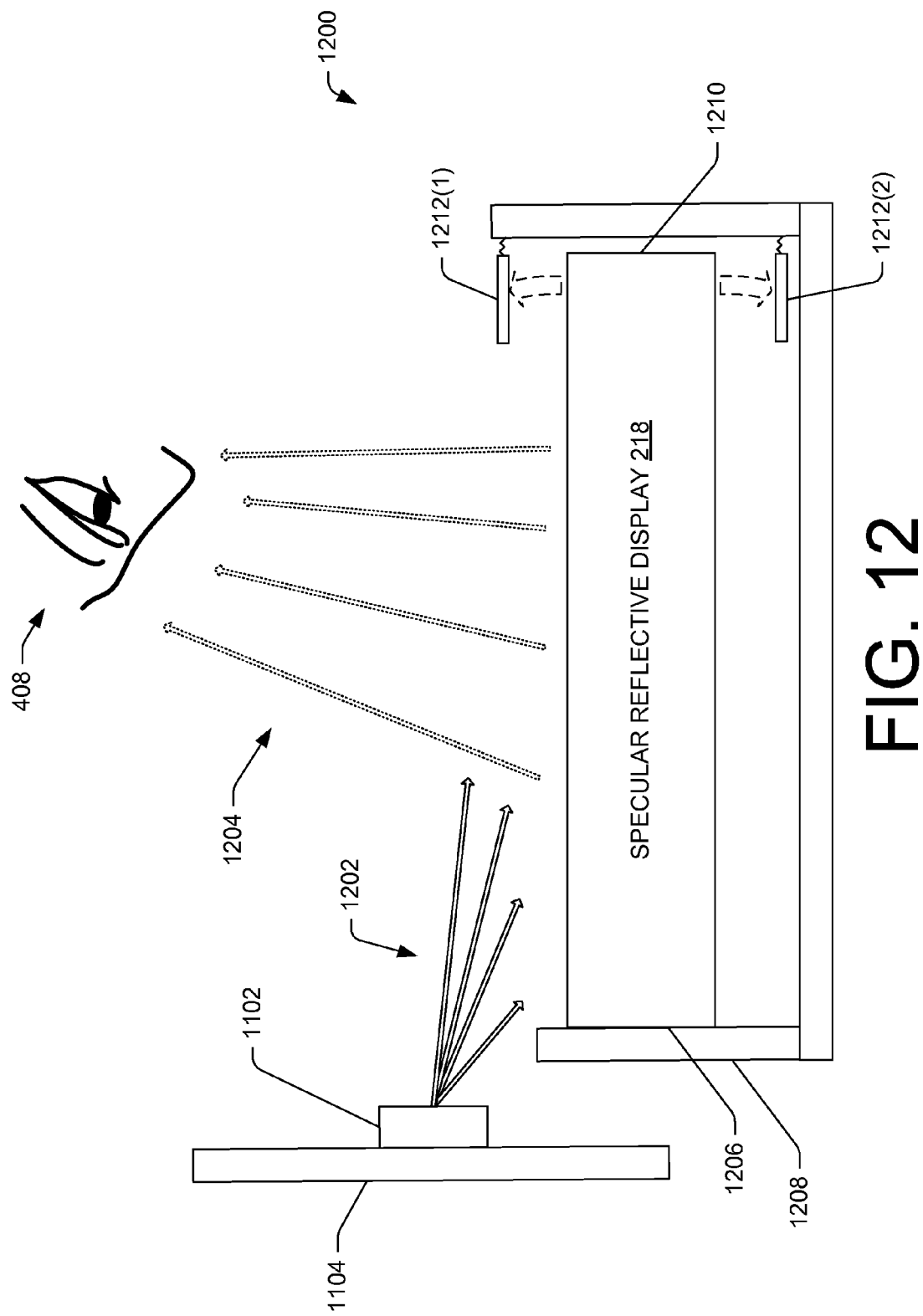
FIG. 12 is a schematic diagram of another illustrative moveable electronic display that can be angled toward a user such that the outward planar surface of the display is at least nearly perpendicular to a line of sight of the user gazing at the display.

FIG. 12 is a schematic diagram of another illustrative moveable specular reflective display 1200 that can be angled toward a user such that the outward planar surface of the display is at least nearly perpendicular to a line of sight of the user gazing at the display. The light source 1102 may be mounted on the structure 1104. The light source 1102 may emit light 1202 that reflects off of the SR display 218 (or a portion of the SR display, such as pixel or group of pixels). Redirected light 1204 may then travel toward the determined user location 408. The SR display 218 (or a portion of the SR display, such as pixel or group of pixels) may be configured as a cantilever via attachment of a first side 1206 of the SR display 218 to a fixed structure 1208. A second, opposite side 1210 of the SR display 218 may selectively move (bend) in a first direction toward a first surface 1212(1) or in a second direction toward a second surface 1212(2). Movement toward the first surface 1212(1) or the second surface 1212(2) may adjust an angle of the SR display or a portion of the SR display 218, causing a change in the direction of the redirected light 1204.

The E/M controller 226 may control the movement of the SR display or portion of the SR display, such as by apply a current which attracts or repels the SR display 218 toward or away from one of the surfaces 1212. Other mechanisms may cause the display to bend or deform, such as mechanical devices including micro-actuators. The movement of the SR display 218 using this approach may only enable small changes in angle. Thus, this approach may be used with other approaches discussed here to "fine tune" an angle of the redirected light. This approach may also be effective when ambient light is a primary source of light.

FIG. 13 is a schematic diagram of an illustrative specular back-reflector 1300 that can be angled such that light exiting the specular reflective display is at least nearly parallel to a line of sight of a user gazing at the display. As shown in FIG. 13, a back reflector 1302 may be movable (rotatable, pivot, etc.) by a moveable mechanism 1304 coupled to another structure 1306. Thus, the moveable mechanism 1304 may adjust an angle of the back reflector 1302, causing a change in a direction of outward light 1308. The E/M controller 226 may control the movement of the back reflector 1302 by the movable mechanism 1304. For example, the moveable mechanism 1304 may be an electromechanical device that moves in response to control signals from a controller. To enable greater changes in angles (redirection of the light), the movable mechanism 1304 may be used for smaller segments of the back reflector 1302. A plurality of movable mechanisms could move corresponding back reflectors to direct light toward the determined user position. This implementation may benefit larger displays, such as fixed wall or building mounted displays, for example. This approach may also be effective when ambient light is a primary source of light.

FIGS. 14A-16B describe various techniques and systems for determining the user position relative to the SR display. Various approaches can be utilized for locating one or more desired features of a user's face to determine various aspects useful for determining relative orientation using one or more cameras or imaging sensors. For example, an image can be analyzed to determine the approximate location and size of a user's head or face.

Figure 14A:
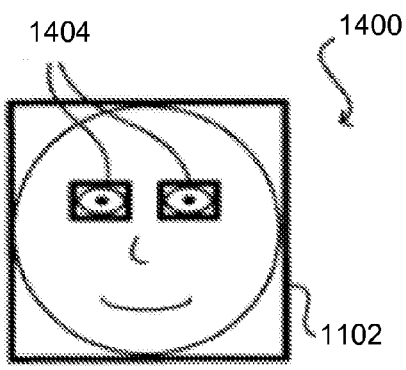
FIGS. 14A-14F illustrate approaches to determining head position and/or gaze direction.

FIG. 14A illustrates an example wherein the approximate position and area of a user's head or face 1400 is determined and a virtual "box" 1402 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 1404 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth. Monitoring box size also helps to provide distance information as well as directional information, which can be helpful when generating a three-dimensional model for modifying image information based on relative user position.

Figure 14B:
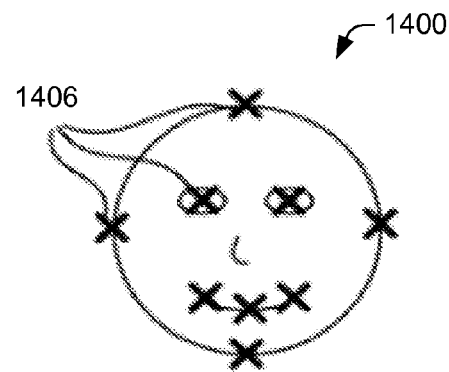

Various other algorithms can be used to determine the location of features on a user's face. For example, FIG. 14B illustrates an example wherein various features on a user's face are identified and assigned a point location 1406 in the image. The system can detect various aspects of user features and can determine more subtle changes in orientation. Such an approach provides advantages over the general approach of FIG. 14A in certain situations, as various other features can be determined, in case the user's eyes cannot be seen due to glasses, hair, etc.

In a basic configuration, a single camera may be used to capture imagery of a user and locate an area of a portion of the user's face, via X and Y axes (i.e., in two-dimensional space), in the captured imagery. This two-dimensional location of the portion of the user's face may suffice as input data to use to adjust display characteristics as discussed above. As an example, the imagery captured by the single camera may be analyzed to distinguish moving portions of imagery between multiple images (which may be inferred to be background) when a face is located generally in a same position (e.g., when a user is walking with a handheld device held in a relatively consistent location relative to the user's head). The opposite situation may also be used where background does not move and the face does move across multiple images. The face may then be identified as being different than the background.

Figure 14C:
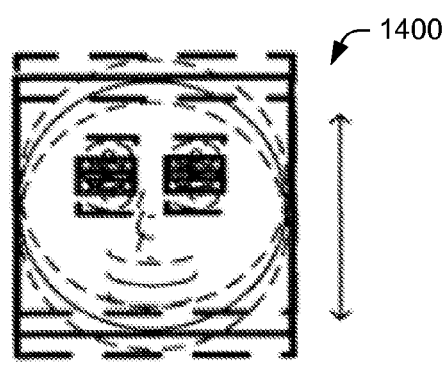
Figure 14D:
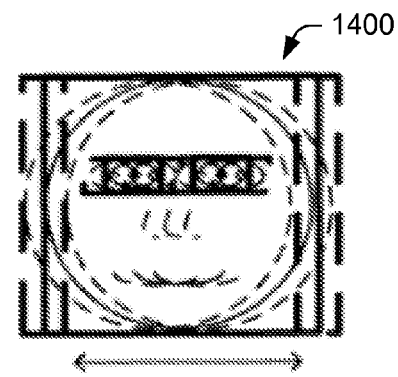
Figure 14E:
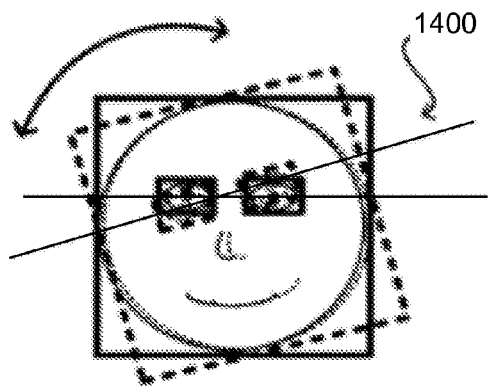
Figure 14F:
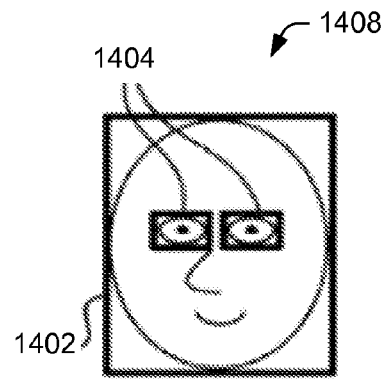

Once the positions of facial features of a user are identified, relative motion between the user and the device can be detected and utilized as input. For example, FIG. 14C illustrates an example where the user's head 1400 is moving up and down with respect to the viewable area of the imaging element. As discussed, this could be the result of the user moving his or her head, or the user moving the device up and down, etc. FIG. 14D illustrates a similar example wherein the user is moving right to left relative to the device, through movement of the user, the device, or both. As can be seen, each movement can be tracked as a vertical or horizontal movement, respectively, and each can be treated differently. As should be understood, such a process also can detect diagonal or other such movements. FIG. 14E further illustrates an example wherein the user tilts the device and/or the user's head, and the relative change in eye position is detected as a rotation. FIG. 14F illustrates another advantage of using an approach such as that described with respect to FIG. 14B to determine the position of various features on a user's face. In this exaggerated example, it can be seen that the features of a second user's head 1408 have a different relative position and separation. Thus, the device also can not only determine positions of features for a user, but can distinguish between different users.

Figure 15A:
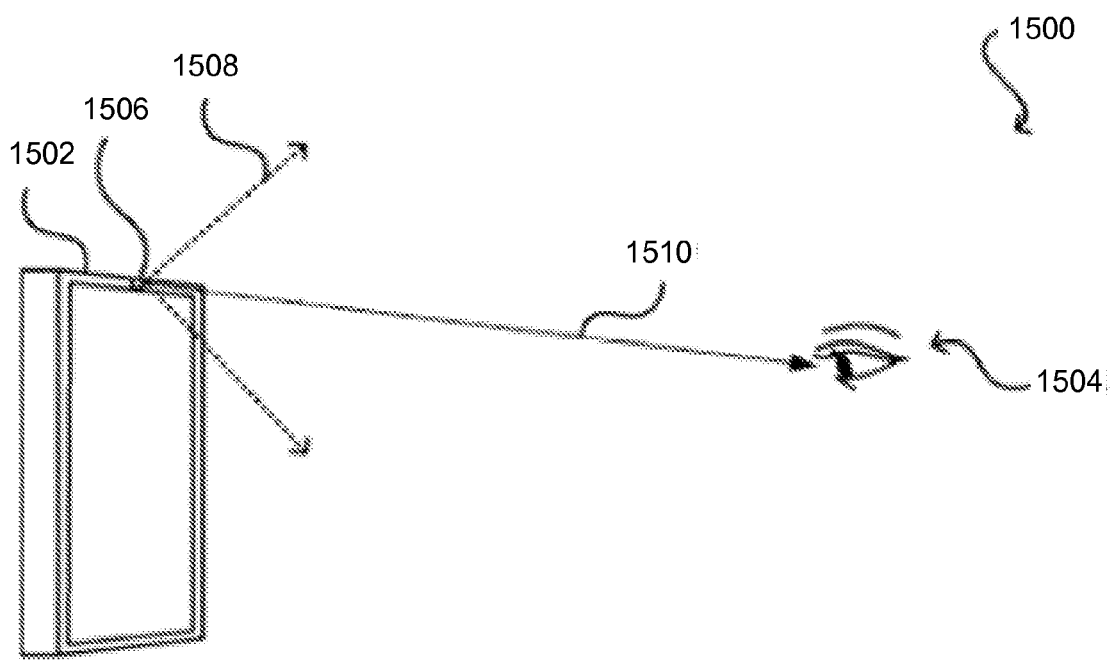
FIGS. 15A and 15B illustrate an example approach to determining the relative position of a user that can be utilized in accordance with various embodiments.

In at least some embodiments, a computing device can utilize one or more cameras or other such sensors to determine the relative direction of the user. For example, FIG. 15A illustrates an example situation 1500 wherein a computing device 1502 is configured to utilize at least one camera element 1506 to attempt to locate a feature of a user, such as the user's head or eyes, for purposes of point of view determination. In this example, the user's eyes 1504 are located within the field of view 1508 of a camera of the computing device 1502. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 1510 of at least one of the user's eyes with respect to the camera. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 15B:
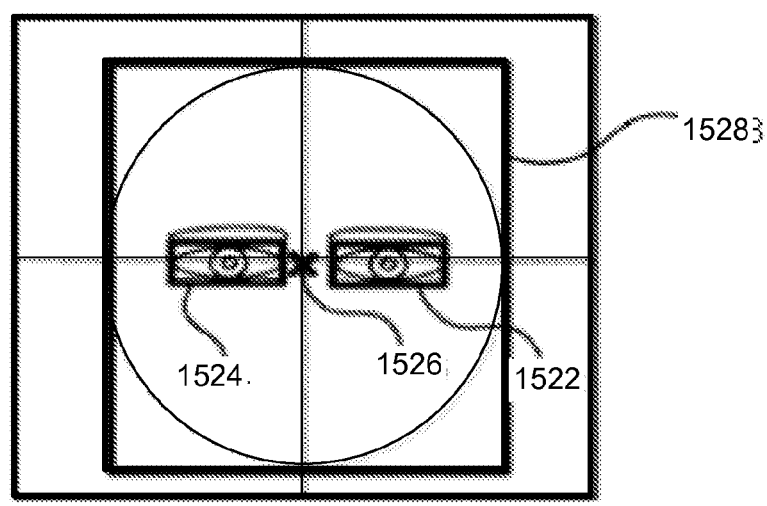

Further illustrating such an example approach, FIG. 15B illustrates an example image 1520 that could be captured of the user's head and eyes using the camera 1506 of FIG. 15A. One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 1522, 1524 for each eye, or at least an approximate location 1528 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 1526 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element of a computing device can be used to determine motions of the computing device, which can help adjust point of view determinations. The sensors can be any appropriate sensors capable of providing information about rotations and/or translations of the device, as may include accelerometers, inertial sensors, electronic gyroscopes, electronic compasses, and the like.

Figure 16A:
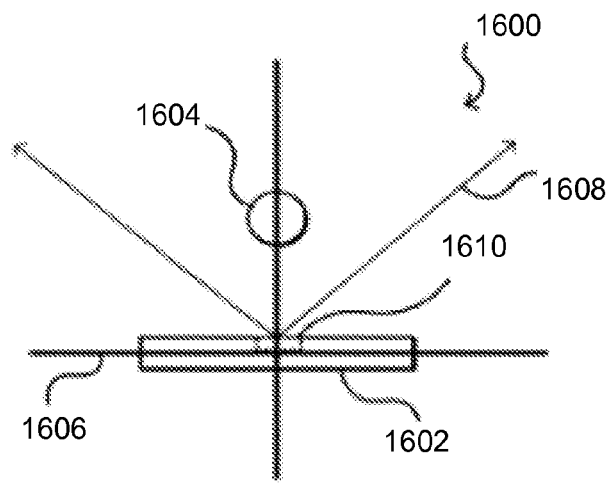
FIGS. 16A and 16B illustrate an example approach to determining device motion that can be utilized in accordance with various embodiments.

For example, FIG. 16A illustrates a "top view" 1600 of a computing device 1602 operable to capture an image of an object 1604 (e.g., a user's head) within an angular view 1608 of a camera 1610 of the computing device. In this example, the computing device 1602 includes at least one orientation-determining or rotation-determining element, such as an electronic compass or electronic gyroscope, that is able to determine a frame of reference 1606 in two or more dimensions with respect to a first orientation of the device. In at least some embodiments, an electronic compass might be used to determine an axis of the frame of reference 1606, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 1606 or orientation can be determined at or near the time of capture of a first image by a camera 1610 of the computing device 1602. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 16B:
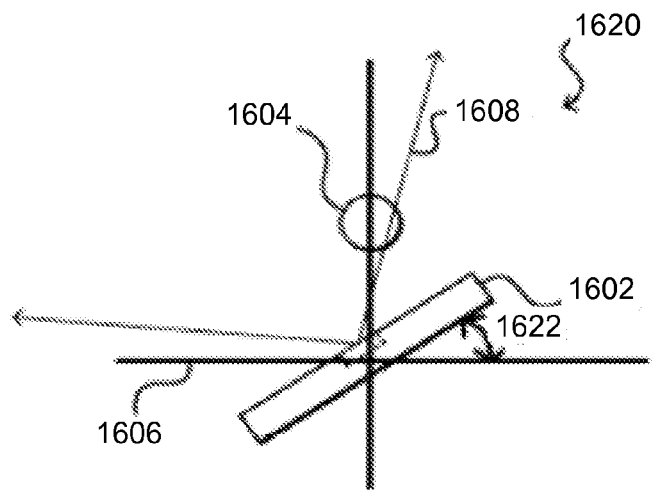

FIG. 16B illustrates a second top view 1610 after a change in orientation of the computing device 1602. The electronic gyroscope (or other such component or embedded sensor) can detect the change in orientation, in this example corresponding to a change in angle 1612 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 1612 about a single axis. As illustrated, this causes the object 1604 to be moved to the right edge of the field of view 1608 of the camera 1610. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:
    determining, based at least in part on data from an image sensor, position data representing an area where at least a portion of a head of a user is relative to an electronic display;
    transmitting, based at least in part on the position data, a first signal to a first mechanism;
    transmitting, based at least in part on the position data, a second signal to a second mechanism;
    causing, via the first mechanism and using the first signal, movement of at least a portion of the electronic display; and
    causing, via the second mechanism and using the second signal, movement of a light guide disposed in front of the electronic display by adjusting an angle between the light guide and the electronic display,
    wherein the light guide is disposed between a front light source and the electronic display,
    wherein the movement of the light guide causes incoming light originating from the front light source to pass through the light guide and to exit the light guide at a first angle as first redirected light towards the electronic display, and
    wherein the movement of at least the portion of the electronic display causes the first redirected light to reflect from the electronic display at a second angle as second redirected light to intersect the area where at least the portion of the head of the user is relative to the electronic display.

2. The method as recited in claim 1, further comprising causing, based at least in part on the position data, a third mechanism to move an object that includes a reflective surface, the movement of the object and the reflective surface changing a reflection angle of the incoming light reflected, by the reflective surface, from the front light source towards the light guide.

3. The method as recited in claim 1, wherein the front light source comprises a first light source at a first location and a second, different light source at a second, different location, the method further comprising transmitting, based at least in part on the position data, a third signal to a light controller to dim or turn off the first light source and intensify or turn on the second, different light source, the first light source and the second light source to emit the incoming light to illuminate the electronic display.

4. The method as recited in claim 1, further comprising transmitting, based at least in part on the position data, a third signal to a third mechanism to cause the third mechanism to move a light array that includes lights of the front light source.

5. The method as recited in claim 1, wherein the electronic display is a specular reflective display.

6. The method as recited in claim 1, further comprising transmitting, based at least in part on the position data, a third signal to a liquid crystal lens located proximate to a front side of the electronic display to cause the liquid crystal lens to modify a direction of the incoming light prior to the incoming light reaching the light guide.

7. The method as recited in claim 1, further comprising transmitting, based at least in part on the position data, a third signal to a lens located proximate to a front viewable side of the electronic display to cause movement of electrophoretic liquid within the lens, the movement of the electrophoretic liquid to modify a direction of the incoming light prior to the incoming light reaching the light guide.

8. The method as recited in claim 1, further comprising transmitting, based at least in part on the position data, a third signal to a layer located proximate to a front viewable side of the electronic display to cause movement of at least one of a reflective polarizer or a prism sheet included in the layer to cause the second redirected light to be directed at the second angle.

9. The method as recited in claim 1, further comprising transmitting, based at least in part on the position data, a third signal to a third mechanism to cause movement of a back reflector of the electronic display, the back reflector to reflect the second redirected light back through the electronic display.

10. The method as recited in claim 1, wherein the portion of the electronic display comprises a group of pixels, and the causing the movement of at least the portion of the electronic display causes, via the first mechanism, rotational movement of the group of pixels.

11. An electronic display assembly comprising:
an electronic display;
a light guide disposed in front of the electronic display;
a first mechanism coupled to at least a portion of the electronic display to cause movement of at least the portion of the electronic display;
a second mechanism coupled to the light guide to cause movement of the light guide by adjusting an angle between the light guide and the electronic display;
at least one light source disposed in front of the light guide to direct light through the light guide and towards the electronic display; and
a controller to:
receive position data representing an area where at least a portion of a head of a user is relative to the electronic display;
transmit, based at least in part on the position data, a first signal to the first mechanism; and
transmit, based at least in part on the position data, a second signal to the second mechanism;
the first mechanism configured to use the first signal to cause the movement of at least the portion of the electronic display,
the second mechanism configured to use the second signal to cause the movement of the light guide by adjusting the angle between the light guide and the electronic display,
wherein the movement of the light guide causes, during operation of the electronic display assembly, incoming light originating from the at least one light source to pass through the light guide and to exit the light guide at a first angle as first redirected light towards the electronic display, and
wherein the movement of at least the portion of the electronic display causes, during the operation of the electronic display assembly, the first redirected light to reflect from the electronic display at a second angle as second redirected light to intersect the area associated with the position data.

12. The electronic display assembly as recited in claim 11, further comprising at least one object having a reflective surface that is movably coupled to the electronic display, and wherein the controller causes movement of the at least one object having the reflective surface to change a direction of the incoming light directed towards the light guide.

13. The electronic display assembly as recited in claim 11, further comprising a third mechanism coupled to a second portion of the electronic display to cause movement of the second portion of the electronic display, wherein the controller is further configured to transmit, based at least in part on the position data, a third signal to the third mechanism, the third mechanism using the third signal to cause the movement of the second portion of the electronic display, and wherein the movement of at least the portion of the electronic display and the movement of the second portion of the electronic display cause the first redirected light to reflect from the electronic display at the second angle.

14. The electronic display assembly as recited in claim 11, wherein the at least one light source is movable by a third mechanism under control of the controller, and wherein the movement of the at least one light source by the third mechanism causes a change in a direction of the incoming light directed towards the light guide.

15. The electronic display assembly as recited in claim 11, wherein the at least one light source includes a first light source at a first location and a second, different light source at a second, different location, and wherein the controller selectively dims or turns off the first light source and intensifies or turns on the second, different light source to cause a change in a direction of the incoming light directed towards the light guide.

16. The electronic display assembly as recited in claim 11, wherein the electronic display is a specular reflective display.

17. The electronic display assembly as recited in claim 11, wherein the portion of the electronic display comprises a group of pixels, and the first mechanism is configured to control rotational movement of the group of pixels such that the group of pixels is rotated upon the movement of at least the portion of the electronic display.

18. An electronic device comprising:
an electronic display;
a light guide disposed in front of the electronic display;
a first mechanism coupled to at least a portion of the electronic display to cause movement of at least the portion of the electronic display;
a second mechanism coupled to the light guide to cause movement of the light guide by adjusting an angle between the light guide and the electronic display;
at least one light source disposed in front of the light guide to direct light through the light guide and towards the electronic display;
memory; and
a processor coupled to the memory, the processor configured to execute instructions stored in the memory to cause the electronic device to:

receive position data representing an area where at least a portion of a head of a user is relative to the electronic display;

transmit, based at least in part on the position data, a first signal to the first mechanism; and transmit, based at least in part on the position data, a second signal to the second mechanism;

the first mechanism configured to use the first signal to cause the movement of at least the portion of the electronic display, the second mechanism configured to use the second signal to cause the movement of the light guide by adjusting the angle between the light guide and the electronic display, wherein the movement of the light guide causes, during operation of the electronic device, incoming light originating from the at least one light source to pass through the light guide and to exit the light guide at a first angle as first redirected light towards the electronic display, and wherein the movement of at least the portion of the electronic display causes, during the operation of the electronic device, the first redirected light to reflect from the electronic display at a second angle as second redirected light to intersect the area associated with the position data.

19. The electronic device as recited in claim 18, wherein the portion of the electronic display comprises a group of pixels, and causing the movement of at least the portion of the electronic display causes, via the first mechanism, rotational movement of the group of pixels.

20. The electronic device as recited in claim 18, wherein the electronic display comprises a specular reflective display.

* * * * *